United States Patent
Komatsu et al.

(10) Patent No.: US 10,644,633 B2
(45) Date of Patent: May 5, 2020

(54) DRIVE CONTROL DEVICE AND DRIVE CONTROL METHOD

(71) Applicant: MITSUBISHI ELECTRIC CORPORATION, Chiyoda-ku (JP)

(72) Inventors: Taiga Komatsu, Chiyoda-ku (JP); Tatsuya Kitamura, Chiyoda-ku (JP)

(73) Assignee: MITSUBISHI ELECTRIC CORPORATION, Chiyoda-ku (JP)

(*) Notice: Subject to any disclaimer, the term of this patent is extended or adjusted under 35 U.S.C. 154(b) by 0 days.

(21) Appl. No.: 16/343,179

(22) PCT Filed: Sep. 12, 2017

(86) PCT No.: PCT/JP2017/032847
§ 371 (c)(1),
(2) Date: Apr. 18, 2019

(87) PCT Pub. No.: WO2018/100835
PCT Pub. Date: Jun. 7, 2018

(65) Prior Publication Data
US 2019/0386598 A1    Dec. 19, 2019

(30) Foreign Application Priority Data

Nov. 29, 2016  (JP) .................... 2016-231209

(51) Int. Cl.
*H02P 1/00* (2006.01)
*H02P 3/00* (2006.01)
(Continued)

(52) U.S. Cl.
CPC ............ *H02P 27/06* (2013.01); *H02K 1/243* (2013.01); *H02M 3/1582* (2013.01); *H02M 7/537* (2013.01)

(58) Field of Classification Search
CPC ................ H02P 27/06; H02K 1/243
(Continued)

(56) References Cited

U.S. PATENT DOCUMENTS

2005/0146308 A1   7/2005  Quazi et al.
2016/0172911 A1   6/2016  Yoshizawa et al.

FOREIGN PATENT DOCUMENTS

JP    2007-135343 A    5/2007
JP    2007-306658 A    11/2007
(Continued)

OTHER PUBLICATIONS

International Search Report dated Dec. 5, 2017 in PCT/JP2017/032847 filed Sep. 12, 2017.
(Continued)

*Primary Examiner* — Erick D Glass
(74) *Attorney, Agent, or Firm* — Oblon, McClelland, Maier & Neustadt, L.L.P.

(57) ABSTRACT

Provided is a drive control device including: a DC voltage source; an inverter configured to switch a switching element, to thereby apply a drive voltage to a rotary electric machine to cause a drive current to flow through the rotary electric machine; and a control unit configured to: control an output voltage of the DC voltage source; and perform control of causing, based on a torque command value for the rotary electric machine, a drive current to flow through the switching element in a first control mode, in which a drive current having a value equal to or smaller than a first current limit value is caused to flow, and a second control mode, in which a drive current having a value larger than the first current limit value is caused to flow.

12 Claims, 10 Drawing Sheets

(51) Int. Cl.
*H02P 5/00* (2016.01)
*H02P 27/06* (2006.01)
*H02K 1/24* (2006.01)
*H02M 3/158* (2006.01)
*H02M 7/537* (2006.01)

(58) Field of Classification Search
USPC ........................................................ 318/139
See application file for complete search history.

(56) References Cited

FOREIGN PATENT DOCUMENTS

| | | |
|---|---|---|
| JP | 2009-232604 A | 10/2009 |
| JP | 2013-60103 A | 4/2013 |
| JP | 2013-90401 A | 5/2013 |
| JP | 2013-93936 A | 5/2013 |
| JP | 2013-230052 A | 11/2013 |
| JP | 2013-255389 A | 12/2013 |
| JP | 2014-113050 A | 6/2014 |
| JP | 2014-193096 A | 10/2014 |
| WO | WO 2014/188995 A1 | 11/2014 |

OTHER PUBLICATIONS

Japanese Office Action dated Jun. 5, 2018, in Patent Application No. 2018-509872, 7 pages (with unedited computer generated English translation).
Extended European Search Report dated Nov. 5, 2019, in Patent Application No. 17876781.0, 8 pages.

DRIVE CONTROL DEVICE AND DRIVE CONTROL METHOD

TECHNICAL FIELD

The present invention relates to a drive control device and method for driving a motor generator, which is a rotary electric machine.

BACKGROUND ART

A related-art control device configured to lower an inverter bus voltage to drive a motor includes: a converter connected to a DC power supply and configured to boost output of the DC power supply for output to an inverter; the inverter configured to convert the output of the converter into AC power for output to a rotary electric machine; and a control unit configured to control the inverter and the converter. The control device switches from PWM control to rectangular wave control when a temperature detection unit configured to detect temperature of a switching element has detected that the temperature of the switching element has reached a predetermined temperature (refer to Patent Literature 1, for example).

Further, another related-art control device configured to lower an inverter bus voltage to drive a motor includes: a DC/DC converter connected to a battery; an inverter; a control unit configured to control the inverter; and a motor generator (rotary electric machine having both functions of a motor configured to be driven through application of a voltage by the inverter and a generator configured to generate electric power by its shaft being driven by an external force). The control unit executes a method involving lowering an input voltage of the inverter and switching a control mode of the inverter from a sinusoidal PWM control mode to an over-modulation control mode or a rectangular wave control mode when a driving frequency at the time of sinusoidal PWM control matches a frequency in a resonance frequency region of an LC resonance circuit (refer to Patent Literature 2, for example).

CITATION LIST

Patent Literature

[PTL 1] JP 2009-232604 A
[PTL 2] JP 2013-90401 A

SUMMARY OF INVENTION

Technical Problem

Each of the control devices described in Patent Literature 1 and Patent Literature 2 exhibits an effect of preventing overcurrent from flowing to the switching element of the inverter. However, a torque output from the motor or the motor generator falls within a limit value determined in advance, resulting in a problem in that the torque cannot be increased to produce high output.

The present invention has been made to solve the above-mentioned problem, and has an object to increase a torque of a rotary electric machine (motor generator) when a control mode is switched to decrease the number of times of switching a switching element.

Solution to Problem

According to one embodiment of the present invention, there is provided a drive control device including: a DC voltage source configured to output a DC output voltage; an inverter, which includes a switching element, and is configured to receive input of the DC output voltage from the DC voltage source and switch the switching element, to thereby apply a drive voltage to a rotary electric machine to cause a drive current to flow through the rotary electric machine; and a control unit configured to: control the DC output voltage of the DC voltage source; and perform control of causing, based on a torque command value for the rotary electric machine, a drive current to flow through the switching element in a first control mode, in which a drive current having a value equal to or smaller than a first current limit value is caused to flow, and a second control mode, in which a drive current having a value larger than the first current limit value and equal to or smaller than a second current limit value, which is larger than the first current limit value, is caused to flow, wherein the control unit is configured to switch, when the torque command value for the rotary electric machine in the first control mode exceeds a predetermined torque value, from the first control mode to the second control mode to perform control of causing an output torque of the rotary electric machine to exceed the predetermined torque value, wherein a period in which the switching element is turned on within a predetermined period in the second control mode is longer than a period in which the switching element is turned on within the predetermined period in the first control mode, wherein a number of times of switching the switching element in the second control mode is smaller than a number of times of switching the switching element in the first control mode, and wherein the DC output voltage of the DC voltage source in the second control mode is smaller than the DC output voltage of the DC voltage source in the first control mode.

According to another embodiment of the present invention, there is provided a drive control method to be executed by a processor, the drive control method including: a determining step of determining whether a torque command value for a rotary electric machine in a first control mode exceeds a predetermined torque value, the first control mode being configured such that a drive current having a value equal to or smaller than a first current limit value is caused to flow through the rotary electric machine by an inverter, the inverter including a switching element and being configured to receive input of a DC output voltage output from a DC voltage source and switch the switching element, to thereby apply a drive voltage to the rotary electric machine to cause the drive current to flow through the rotary electric machine; a switching step of switching, when it is determined in the determining step that the torque command value for the rotary electric machine in the first control mode exceeds the predetermined torque value, from the first control mode to a second control mode, in which a drive current having a value larger than the first current limit value and equal to or smaller than a second current limit value, which is larger than the first current limit value, is caused to flow; and a torque control step of performing control of causing an output torque of the rotary electric machine to exceed the predetermined torque value in the second control mode, to thereby cause a drive current to flow through the switching element, wherein a period in which the switching element is turned on within a predetermined period in the second control mode is longer than a period in which the switching element is turned on within the predetermined period in the first control mode, wherein a number of times of switching the switching element in the second control mode is smaller than a number of times of switching the switching element in the first control mode, and wherein the DC output voltage of the DC voltage source in the second control mode is lower than the DC output voltage of the DC voltage source in the first control mode.

Advantageous Effects of Invention

With the drive control device and method configured as described above, the number of switching pulses for the switching element is decreased to increase the current limit value of the switching element, and a current that can flow through a stator of the rotary electric machine can be increased. Therefore, it is possible to increase the torque that is output from the rotary electric machine.

DESCRIPTION OF EMBODIMENTS

In the following, a description is given in detail of a drive control device according to each of embodiments of the present invention with reference to the drawings.

First Embodiment

Figure 1:
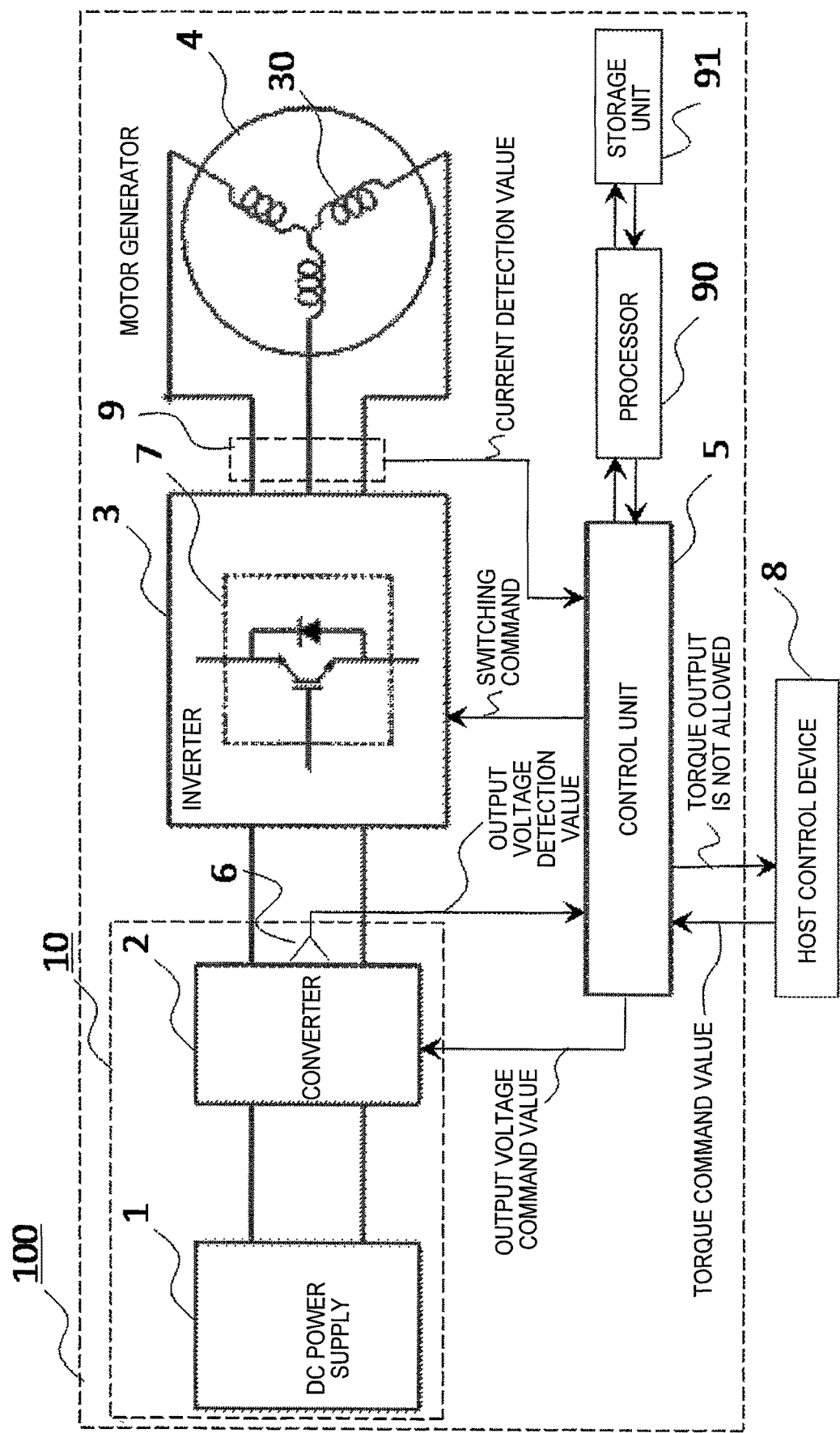
FIG. 1 is a block diagram for illustrating a schematic configuration of a drive control device according to a first embodiment of the present invention.

FIG. 1 is a block diagram for illustrating a schematic configuration of a drive control device according to a first embodiment of the present invention.

As illustrated in FIG. 1, a drive control device 100 includes: a DC power supply 1; a converter 2 connected to the DC power supply 1 and configured to input a DC voltage from the DC power supply 1 and output a DC output voltage; an inverter 3 connected to the converter 2 and configured to convert DC power into AC power; a motor generator 4 connected to the inverter 3; and a control unit 5 configured to control the converter 2 and the inverter 3.

The DC power supply 1 includes, for example, a lead-acid battery or a lithium-ion battery, and is configured to output a DC voltage of, for example, 48 V, to the converter 2.

The converter 2 is configured to input DC power output from the DC power supply 1, and output the DC power to the inverter 3. Further, the converter 2 is capable of performing power conversion of inputting a DC voltage of the DC power supply 1 and lowering the DC voltage, and operates so as to output an output voltage to the inverter 3. The output voltage to be output from the converter 2 can be changed in a range of from 12 V to 48 V, for example, and PAM control is conceivable as a voltage conversion method, for example. Further, a voltage measurement unit 6 is provided on the output side of the converter 2. The voltage measurement unit 6 is configured to detect the output voltage of the converter 2, and output the output voltage to the control unit 5 as an output voltage detection value. The output voltage detection value is equivalent to the output voltage output from the converter 2.

The DC power supply 1 and the converter 2 of FIG. 1 may be one DC voltage source 10 configured to output a DC output voltage. That is, the DC voltage source 10 includes the DC power supply 1 and the converter 2 configured to input a DC voltage of the DC power supply 1 and output an output voltage.

The inverter 3 includes a switching element 7, and is configured to input the output voltage from the DC voltage source 10 and switch the switching element 7, to thereby apply a drive voltage to the motor generator 4. In the inverter 3, the switching element 7 is switched and the inverter 3 is connected to the switching element 7 in a conductive manner so that a drive current is caused to flow through an armature coil 30 of each phase of a stator in the motor generator 4, and a drive current flowing through the armature coil 30 of each phase of the stator of the motor generator 4 can be controlled.

A current detector 9 is provided between the inverter 3 and the motor generator 4. The current detector 9 is configured to detect a current detection value, which is a drive current flowing through the motor generator 4 and the switching element 7, and output the current detection value to the control unit 5.

The control unit 5 is configured to input an output voltage detection value detected by the voltage measurement unit 6 provided on the output side of the converter 2, a current detection value detected by the current detector 9, and a torque command value, which is a command value for the torque of the motor generator 4, from a host control device 8. The control unit 5 is configured to calculate an output voltage command value based on the torque command value for the motor generator 4, output the output voltage command value to the converter 2, and control the output voltage detection value to become closer to the output voltage command value, to thereby control the output voltage of the converter 2 in the DC voltage source 10. Further, the control unit 5 is configured to perform control of outputting a switching command based on the torque command value for the motor generator 4, and causing a drive current to flow through the switching element 7 in a first control mode and a second control mode described later. Further, the control unit 5 is configured to output a torque output disabled signal described later to the host control device 8.

The motor generator 4 includes a stator including the armature coil 30, to which a drive voltage is to be applied, and a rotator arranged facing an inner circumferential side of the stator in a freely rotatable manner. A drive voltage is applied to a space between lines (two phases) of the armature coil 30 of the stator by the inverter 3 and a drive current is caused to flow through the armature coil 30 under a state in which a magnetic flux is generated in the rotator, so that the motor generator 4 outputs a torque. The motor generator 4 is, for example, a rotary electric machine including the armature coil 30 of three phases, for example, a U-phase, a V-phase, and a W-phase.

Next, a description is given of an operation in the first embodiment. Now, a description is given of a case in which control at a time of a first control mode, which is a mode of control before switching, is set to be pulse width modulation (PWM) control, and control at a time of a second control mode, which is a mode of control after switching, is set to be rectangular wave control.

First, the control unit 5 receives a torque command value for the motor generator 4 from the host control device 8. The control unit 5 holds, as data, a first torque value (hereinafter referred to as "first short-time maximum torque") determined in advance, which corresponds to the maximum value of a torque that can be output at the time of PWM control, which is control before switching, under a certain condition of temperature or the number of revolutions, for example. The first short-time maximum torque is a value corresponding to a first current limit value described later. The control unit 5 compares the torque command value received from the host control device 8 with the first short-time maximum torque, and determines that the motor generator 4 can output a torque corresponding to the torque command value when the torque command value is smaller than the first short-time maximum torque. Then, the control unit 5 transmits a switching command, which is an operation command for the inverter 3, to the inverter 3 depending on the torque command value, and switches the switching element 7 in the inverter 3.

For example, the control unit 5 calculates a current command value corresponding to a drive current required for outputting a torque corresponding to the torque command value. Then, the control unit 5 calculates a voltage command value in d- and q-axes by PT control based on a difference between the current command value and a current detection value that is detected by the current detector 9 and indicates a drive current flowing through the motor generator 4 and the switching element 7. Then, on the basis of a value obtained by converting the voltage command value in the d- and q-axes into a three-phase voltage command value, the control unit 5 outputs, to the inverter 3, a switching command generated by comparing a carrier wave with a modulated wave based on the three-phase voltage command value, for example. The inverter 3 switches the switching element 7 based on the switching command so that the PWM control is performed based on a switching pulse, and the output voltage of the input DC voltage is converted into an AC drive voltage and applied to the armature coil 30 of the motor generator 4.

When the torque command value received from the host control device 8 is larger than the first short-time maximum torque that can be output at the time of PWM control, the control unit 5 switches from the first control mode to the second control mode, and refers to a second short-time maximum torque being a second torque value determined in advance in control of decreasing the number of times of switching the switching element 7. The second short-time maximum torque is a value corresponding to a second current limit value described later. The second short-time maximum torque being the second torque value is larger than the first short-time maximum torque being the first torque value. In the first embodiment, the control of decreasing the number of times of switching the switching element 7 is set to be rectangular wave control of switching, in half a period of the electrical angle (180°), for example, one switching element 7 on and off only once each (when the switching pulse has a width smaller than half the period of the electrical angle) or switching the switching element 7 on or off only once (when the switching pulse has a width equal to half the period of the electrical angle). As a result, the number of switching pulses in half the period of the electrical angle is one.

That is, in the second control mode, the control unit 5 performs the rectangular wave control of controlling the drive voltage of the inverter 3 in a rectangular wave form. Further, the number of times of switching the switching element 7 at the time of rectangular wave control in the second control mode is smaller than the number of times of switching the switching element 7 in the first control mode. Further, a period in which the switching element 7 is turned on within a predetermined period at the time of rectangular wave control in the second control mode is larger than a period in which the switching element 7 is turned on within the predetermined period in the first control mode.

The control unit 5 determines a magnitude relationship between the second short-time maximum torque and the torque command value in the control of decreasing the number of times of switching the switching element 7. When the control unit 5 determines that the second short-time maximum torque is larger than the torque command value at the time of decreasing the number of times of switching the switching element 7, the control unit 5 transmits, to the converter 2, an output voltage command value enabling output of a torque corresponding to the torque command value, and operates the converter 2 to output an output voltage enabling output of the torque corresponding to the torque command value. At this time, the control unit 5 lowers the output voltage of the converter 2 from the DC voltage output from the DC power supply 1, and at the same time, decreases the number of times of switching the switching element 7 to the number of times of switching that enables output of the torque corresponding to the torque command value.

That is, when the torque command value for the motor generator 4 in the first control mode exceeds the first short-time maximum torque, which is the first torque value determined in advance, the control unit 5 switches from the first control mode to the second control mode to perform control of causing the output torque of the motor generator 4 to exceed the first torque value determined in advance.

The current limit value of a drive current that can flow through the switching element 7 changes depending on the number of times of switching the switching element 7. This is because the current limit value of the switching element 7 is mainly determined by a limit value of an amount of heat generated in the switching element 7.

Further, the amount of heat generated in the switching element 7 is mainly classified into a conduction loss and a switching loss in the switching element 7. The conduction loss is a loss that occurs when a drive current is caused to flow through the switching element 7 under the conduction state of the switching element 7. The switching loss is a loss that occurs through switching of the switching element 7. The switching loss changes depending on the frequency of switching, which is the number of times of switching the switching element 7 per unit time. In general, as the frequency of switching increases, the switching loss in the switching element 7 increases. Further, the limit value of the amount of heat generated in the switching element 7 is almost fixed when the ambient temperature is fixed. Thus, under a condition in which the ambient temperature does not change, the current limit value of a drive current that can flow through the switching element 7 changes due to distribution of the conduction loss and the switching loss in the amount of heat generated in the switching element 7.

Now, it is assumed that the inverter 3 is operated under a condition in which a drive current flowing through the switching element 7 is equal to the current limit value at the time of PWM control in the first control mode, which is control before switching. A case of lowering the output voltage of the converter 2 in the first control mode to switch to the rectangular wave control, which is the second control mode, by the control unit 5 is considered.

Now, it is assumed that a drive current at the time of rectangular wave control in the second control mode is the same value as a drive current at the time of PWM control in the first control mode. The drive currents are the same as each other, and thus the conduction loss caused in the switching element 7 is fixed. Meanwhile, when the control is switched to the rectangular wave control in the second control mode, the number of times of switching the switching element 7 decreases, and as a result, the switching loss in the second control mode decreases from the switching loss in the first control mode. As described above, the loss caused in the switching element 7 includes a conduction loss and a switching loss. Therefore, the loss generated in the switching element 7 in the second control mode decreases from the loss caused in the switching element 7 in the first control mode.

However, the limit value of the amount of heat generated in the switching element 7 at the time of rectangular wave control in the second control mode is the same as the limit value of the amount of heat generated at the time of PWM control in the first control mode. Thus, it is possible to further cause a current to flow through the switching element 7 so as to compensate for decrease in the switching loss at the time of rectangular wave control. Therefore, when the control mode is switched from the first control mode to the second control mode and the rectangular wave control is continued until the drive current reaches the current limit value, it is possible to increase the drive current in the second control mode to a value larger than the drive current at the time of PWM control in the first control mode.

Thus, the current limit value of the switching element 7 is the first current limit value in the first control mode, and the current limit value of the switching element 7 is the second current limit value being larger than the first current limit value in the second control mode. That is, the control unit 5 performs control of causing, based on the torque command value for the motor generator 4, a drive current to flow through the switching element 7 in the first control mode, in which a drive current having a value equal to or smaller than the first current limit value is caused to flow, and in the second control mode, in which a drive current having a value larger than the first current limit value and equal to or smaller than the second current limit value, which is larger than the first current limit value, is caused to flow.

Further, when the control is switched to the rectangular wave control in the second control mode with the output voltage of the converter 2 being fixed to a predetermined value, a duty ratio, which is a ratio of a time in which a current is caused to flow through the switching element 7 to a predetermined period, drastically increases. Meanwhile, an impedance of the armature coil 30 of the motor generator 4 and an impedance of the switching element 7 are fixed, and hence there is a possibility that a drive current flowing through the switching element 7 drastically increases to exceed the current limit value. Thus, the control unit 5 is required to output an output voltage command value to the converter 2 to lower the output voltage of the converter 2 so that the control is switched to the rectangular wave control in the second control mode and a drive current having a value equal to or smaller than the current limit value is caused to flow through the switching element 7.

That is, when the amount of heat generated in the switching element 7 due to a drive current after the control is switched to the rectangular wave control in the second control mode exceeds a limit value of the amount of heat generated in the switching element 7 and the torque command value after the control is switched to the rectangular wave control in the second control mode is smaller than the second short-time maximum torque, the control unit 5 outputs an output voltage command value for lowering the output voltage to the converter 2 to lower a drive current flowing through the switching element 7 and suppress the drive current to be equal to or smaller than the second current limit value. Thus, the output voltage of the DC voltage source 10 in the second control mode is smaller than the output voltage of the DC voltage source 10 in the first control mode.

A processor 90 executes a program stored in the storage unit 91 to perform the processing of the control unit 5 described above.

The storage unit 91 includes a memory storing, for example, an electric circuit constant of the rotary electric machine 4 and parameters required for control thereof and a program describing the above-mentioned processing. The processor 90 includes a processor obtained by constructing a logic on a hardware circuit such as a microcomputer, a digital signal processor (DSP), or an FPGA. Further, a plurality of processors 90 and a plurality of storage units 91 may execute the above-mentioned function in cooperation with one another.

Figure 2:
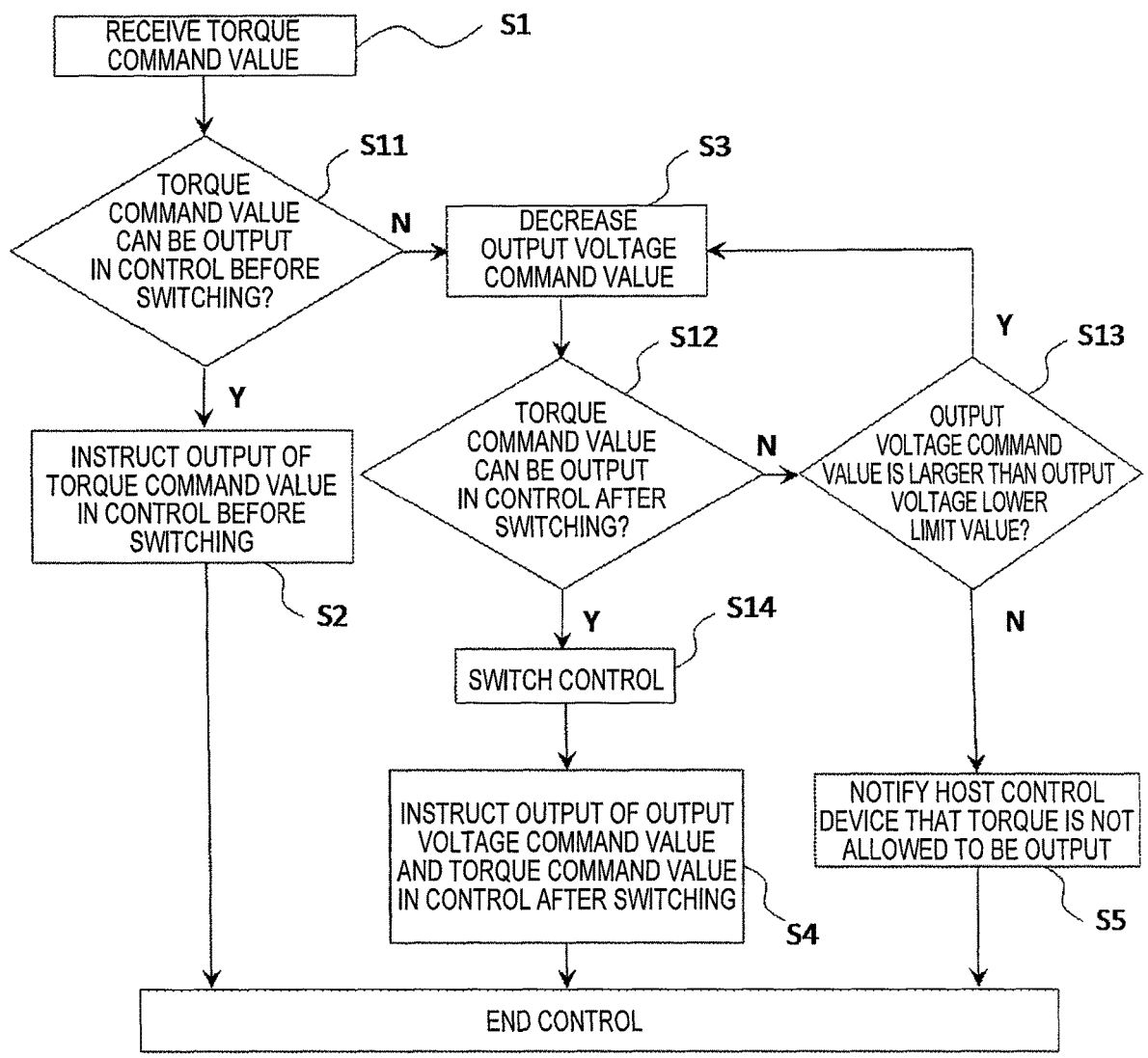
FIG. 2 is a flowchart for illustrating switching of a control mode by the drive control device according to the first embodiment of the present invention.

FIG. 2 is a flowchart for illustrating switching of the control mode by the drive control device according to the first embodiment. In FIG. 2, first, in Step S1, the drive control device 100 receives a torque command value for the motor generator 4 from the host control device 8.

Next, in a determination step S11, the control unit 5 determines whether the motor generator 4 can output a torque corresponding to the torque command value in the first control mode.

Specifically, when the torque command value is equal to or smaller than the first short-time maximum torque, the control unit 5 determines that the motor generator 4 can output the torque corresponding to the torque command value, whereas when the torque command value is larger than the first short-time maximum torque, the control unit 5 determines that the motor generator 4 cannot output the torque corresponding to the torque command value. When the determination result indicates that the motor generator 4 can output the torque corresponding to the torque command value in the first control mode, in Step S2, the control unit 5 outputs the torque corresponding to the torque command value without switching control from the first control mode.

When the determination result indicates that the motor generator 4 cannot output the torque corresponding to the torque command value in the first control mode, the processing advances to Step S3. In Step S3, the control unit 5 decreases the output voltage command value of the converter 2 to start determination.

That is, in the determination step S11, the control unit determines whether the torque command value for the motor generator 4 exceeds the first short-time maximum torque, which is the first torque value determined in advance, in the first control mode, in which a drive current having a value equal to or smaller than the first current limit value is caused to flow through the motor generator 4 by the inverter 3 including the switching element 7 and being configured to input a DC output voltage output from the DC voltage source 10, switch the switching element 7 to apply the drive voltage to the motor generator 4, and cause a drive current to flow through the motor generator 4.

Next, in Step S12, the control unit 5 refers to the second short-time maximum torque under control in the second control mode in which the decreased output voltage command value is applied to determine whether the motor generator 4 can output the torque corresponding to the torque command value based on the magnitude relationship between the second short-time maximum torque and the torque command value. In Step S12, when the control unit 5 determines that the torque command value is equal to or smaller than the second short-time maximum torque and the motor generator 4 can output the torque corresponding to the torque command value, in a switching step S14, the control unit 5 switches the control mode from the first control mode to the second control mode.

That is, when the control unit 5 determines in the determination step S11 that the torque command value for the motor generator 4 in the first control mode exceeds the first short-time maximum torque, which is the first torque value determined in advance, in the switching step S14, the control unit 5 switches from the first control mode to the second control mode, in which a drive current having a value larger than the first current limit value and equal to or smaller than the second current limit value, which is larger than the first current limit value, is caused to flow.

Next, in a torque control step S4, under control in the second control mode, the control unit 5 outputs an output voltage command value for lowering the output voltage to the converter 2, outputs a switching command for outputting the torque corresponding to the torque command value to the inverter 3, and ends the control.

That is, in the torque control step S4, the control unit 5 performs control in which the output torque of the motor generator 4 exceeds the first short-time maximum torque being the first torque value determined in advance in the second control mode, to thereby cause a drive current to flow through the switching element 7.

When the control unit 5 determines in Step S12 that the motor generator 4 cannot output the torque corresponding to the torque command value, in Step S13, the control unit 5 determines whether the output voltage command value is larger than an output voltage lower limit value of the output voltage that can be output from the converter 2. When the output voltage command value is larger than the output voltage lower limit value in Step S13, the processing returns to Step S3, and the determination is made under a condition in which the output voltage command value is further decreased. When the output voltage command value is equal to or smaller than the output voltage lower limit value in Step S13, the output voltage command value cannot be further decreased, and thus the torque corresponding to the torque command value cannot be output. Thus, in that case, in Step S5, the control unit 5 issues, to the host control device 8, a notification indicating that the torque is not allowed to be output, and ends the control.

Figure 3:
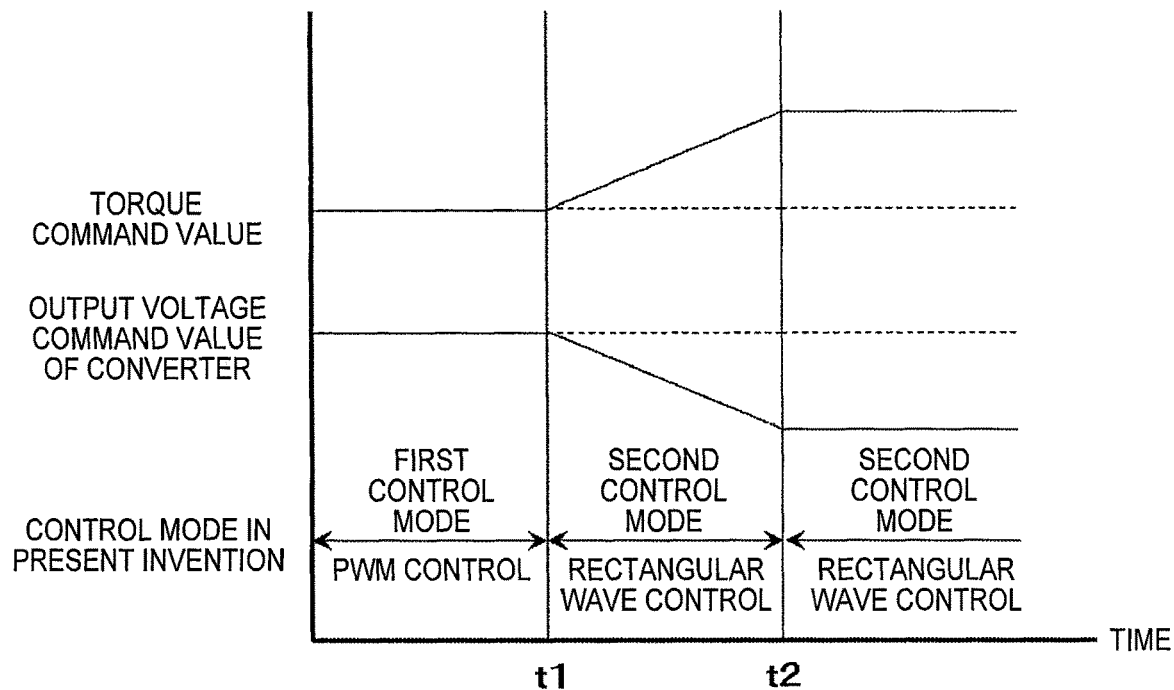
FIG. 3 is a graph for showing a timing at which the drive control device according to the first embodiment of the present invention switches the control mode.

FIG. 3 is a graph for showing a timing at which the drive control device according to the second embodiment switches the control mode. In FIG. 3, the horizontal axis represents time, and the vertical axis represents the torque command value and the output voltage command value of the converter. In FIG. 3, at a time t1, at which the inverter 3 is driven under the PWM control in the first control mode, which is control before switching, the control unit 5 receives a torque command value for further increasing the torque from the host control device 8. At the time t1, the control unit 5 decreases the output voltage command value received from the converter 2, and switches the control to the rectangular wave control in the second control mode.

From the time t1 to a time t2, the torque command value is controlled to be increased monotonically. Further, the output voltage command value is controlled to be decreased along with increase in torque command value. Further, when the inverter 3 is driven under the rectangular wave control in the second control mode, the control unit 5 drives the inverter 3 in a torque range having the second short-time maximum torque as the maximum torque that can be output from the motor generator 4.

At the time t2, the output voltage of the converter 2 reaches the output voltage command value specified by the control unit 5. Further, the torque of the motor generator 4 is the torque command value received from the host control device 8, and switching of control is finished.

After the time t2, the control unit 5 performs control of keeping the output voltage command value at a fixed value until the torque command value received from the host control device 8 changes.

Now, an effect in the first embodiment is described.

As described above, when the output voltage of the converter 2 is lowered, the current limit value of a drive current that can flow through the switching element 7 changes depending on the number of times of switching the switching element 7. At this time, for example, even when the output voltage is lowered and the switching element 7 is switched so that the drive voltage of the inverter 3 becomes a rectangular wave, the control unit 5 can lower the output voltage of the converter 2 and decrease the number of times of switching the switching element 7 to increase a drive current that can flow through the armature coil 30 of the motor generator 4 as long as a drive current in the second control mode falls within the second current limit value and a drive current having a value larger than the first current limit value of the drive current in the PWM control in the first control mode can be caused to flow.

Figure 4:
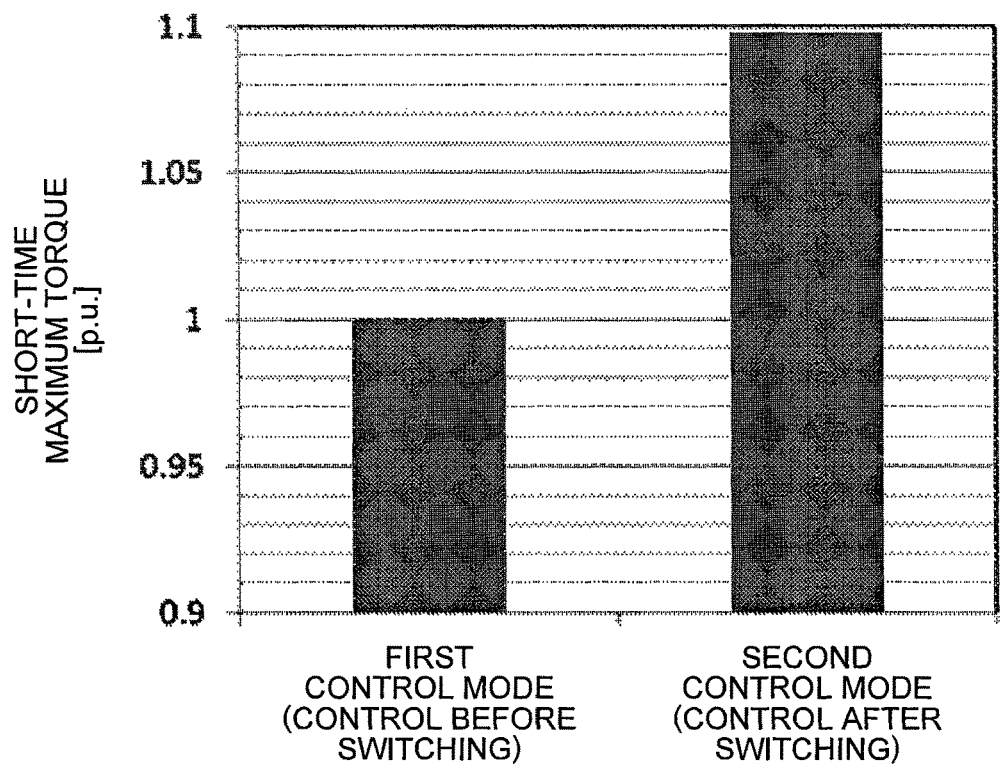
FIG. 4 is a graph for showing an effect of producing a high torque by the drive control device according to the first embodiment of the present invention.

FIG. 4 is a graph for showing an effect of producing a high torque by the drive control device according to the first embodiment.

In FIG. 4, the horizontal axis represents the first control mode and the second control mode, whereas the vertical axis represents a short-time maximum torque in a case where the short-time maximum torque in the first control mode is set as a reference. FIG. 4 is a graph in which short-time maximum torques, which are torque values determined in advance and can be output from the motor generator 4 in the first and second control modes, are compared with each other when the output voltages of the converter 2 are set to 48 V in the first control mode and 12 V in the second control mode under a condition in which the DC voltage being the output of the DC power supply 1 is 48 V. It is understood that the short-time maximum torque that can be output from the motor generator 4 increases due to increase in drive current that can flow through the armature coil 30 of the motor generator 4 in the rectangular wave control in the second control mode.

There is known an automobile for propelling the vehicle by compensating for the driving force of an engine by a motor generator as represented by, for example, a hybrid vehicle and a vehicle having mounted thereon a motor generator capable of transmitting motive power via an engine and a belt. This automobile may temporarily stop the engine under a state in which the vehicle is stopped, for example, to suppress fuel consumption in order to improve the fuel efficiency. Such a vehicle is required to restart the engine by the motor generator under a temporarily stopped state of the engine in order to restart the vehicle. When the engine is restarted, motive power exceeding a friction force that is caused in the engine or apart for power transmission, for example, a belt, is required. Thus, the motor is required to have a high torque performance.

As described above, when the first short-time maximum torque of the motor generator 4 in the first control mode, which is control before switching, is smaller than a torque required for restarting the engine, the engine is not restarted as a matter of course. Meanwhile, when the control is switched and the second short-time maximum torque of the motor generator 4 becomes larger than the torque required at the time of restarting the engine, the motor generator 4 causes the second short-time maximum torque, and thus the control unit 5 performs control of switching the control mode to the second control mode to lower the output voltage of the converter 2. Then, the control unit 5 can restart the engine by outputting a switching command corresponding to the torque command value to the inverter 3. Therefore, it is possible to improve the torque of the motor generator 4 by switching from the first control mode to the second control mode by the control unit 5. A more large-sized engine can be restarted, or an engine can be restarted even in a more small-sized motor generator. Thus, it is possible to contribute to downsizing of an engine room.

In the description given above, the condition of switching the switching element 7 so that the drive current of the switching element 7 flows as a rectangular wave is given as an example. As another example, it is conceivable that a current is caused to flow through the switching element 7 so that a plurality of switching pulses are generated in half the period of the electrical angle. Also in this case, it is possible to decrease the switching loss for PWM control before change of the output voltage. Therefore, it is possible to increase the current limit value of the drive current also when the output voltage is lowered to decrease the number of times of switching. As a result, the torque output from the motor generator 4 increases.

The method of causing a current to flow through the switching element 7 so that a plurality of switching pulses are generated in half the period of the electrical angle in the second control mode includes, for example, a case of switching the switching element 7 in synchronization with the frequency of the drive voltage, such as three-pulse control and five-pulse control, or a case of controlling the switching element 7 by decreasing the carrier frequency for PWM control in the first control mode, which is control before switching. That is, in the second control mode, the control unit 5 performs synchronized pulse control of switching the switching element 7 in synchronization with half the period of the electrical angle of the drive voltage by a predetermined number of times within half the period of the electrical angle of the drive voltage.

In the first embodiment, at the time of switching of control, whether the control can be switched is determined based on the short-time maximum torque corresponding to the current limit value of a drive current that can flow through the switching element 7. However, after switching of control, whether the control can be switched is not required to be determined based on the short-time maximum torque corresponding to the current limit value of a drive current. For example, a resistance value of the switching element 7 of the inverter 3, a resistance value of the armature coil 30 of the motor generator 4, a current value derived from the DC output voltage detection value of the DC voltage source 10, and a current limit value of a drive current that can flow through the switching element 7 are compared with one another. When it is known in advance that the current value is obviously lower than the current limit value of a drive current, the magnitude relationship between the torque command value and the second short-time maximum torque corresponding to the second current limit value of a drive current is not required to be determined in the second control mode at the time of switching of control. Therefore, at the time of switching of control, in Step S12 of FIG. 2, it may not be determined whether the torque command value is equal to or smaller than the second short-time maximum torque based on the second short-time maximum torque corresponding to the second current limit value of a drive current.

Further, in the first embodiment, the converter 2 is described as having a function of lowering the DC voltage output from the DC power supply 1. However, the converter 2 may further have a function of increasing the DV voltage output from the DC power supply 1. However, an operation of increasing the torque output from the motor generator 4 is desired to involve outputting an output voltage having the lowered DC voltage from the DC power supply 1 by the converter 2. That is, the converter 2 of the DC voltage source 10 outputs an output voltage smaller than the DC voltage.

Further, in the first embodiment, although the lead-acid battery or the lithium-ion battery has been described as an example of the DC power supply 1, the DC power supply 1 is not limited thereto, and for example, an electric double-layer capacitor may be employed. Further, although two voltage values, namely, 12 V and 48 V have been described as an example of the output voltage of the converter 2, the output voltage of the converter 2 is not limited thereto.

Further, in the first embodiment, although the description has been given by using the motor generator 4, the motor generator 4 is not required to have both functions of the motor and the generator. For example, the motor generator 4 may have only the function of the motor. Further, the description has been given of a rotary electric machine of three phases, namely, the U-phase, the V-phase, and the W-phase. However, the number of phases is not limited thereto, and the present invention can be applied to, for example, a rotary electric machine of five phases, seven phases, or dual-three phases.

Further, in the first embodiment, the description has been given of the method of switching control when the torque command value is higher than the first short-time maximum torque that can be output at the time of PWM control in the first control mode. However, the criterion for determining the magnitude relationship with the torque command value is not required to be set to the first short-time maximum torque that can be output at the time of PWM control in the first control mode. For example, the first current limit value of the drive current under the state of control in the first control mode before switching may be set to a current value of the motor generator 4 at the time of output of a torque that enables continuous operation. Then, the magnitude relationship between the current value and a drive current that corresponds to the torque command value based on this current value may be determined, and control may be switched to drive the motor generator 4.

Further, in the first embodiment, the description has been given of a case in which the first control mode, which is control before switching, is the PWM control. However, as another example, for example, on the assumption that the first control mode is synchronized nine-pulse control and the second control mode is rectangular wave control, the maximum torque that can be output in the synchronized nine-pulse control may be set to the first short-time maximum torque, and may be used for determining the magnitude relationship with the torque command value. The synchronized nine-pulse control is a method of switching control in synchronization with half the period of the electrical angle. Thus, in the first control mode, the method may not be a method of driving the motor generator 4 asynchronously for one period of the electrical angle as in the case of the PWM control. Further, in the second control mode after switching of control, the method is only required to be a method of driving the motor generator 4 with control of decreasing the number of times of switching the switching element 7 to be smaller than the number of times of switching the switching element 7 in the first control mode.

Further, in the first embodiment, the description has been given of an example of driving the motor generator 4 by the rectangular wave control during the period from the time t1 to the time t2 of FIG. 3. However, control from the time t1 to the time t2 is not required to be set to the rectangular wave control. For example, control in the second control mode may be the synchronized nine-pulse control or control of decreasing the carrier frequency for the first control mode, which is control before switching.

Further, in the first embodiment, the description has been given of a case of directly switching from the first control mode, which is control before switching, to the second control mode, which is control after switching. However, the first control mode is not required to be directly switched to the second control mode.

Figure 5A:
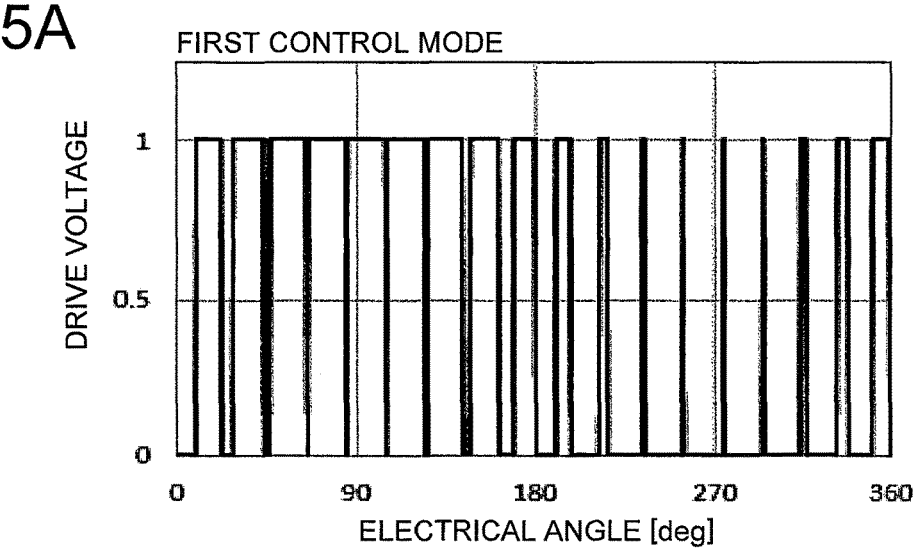
FIG. 5A is a graph for showing a pulse waveform in a first control mode in a case where a drive control device according to a modification example of the first embodiment of the present invention switches the control mode.
Figure 5B:
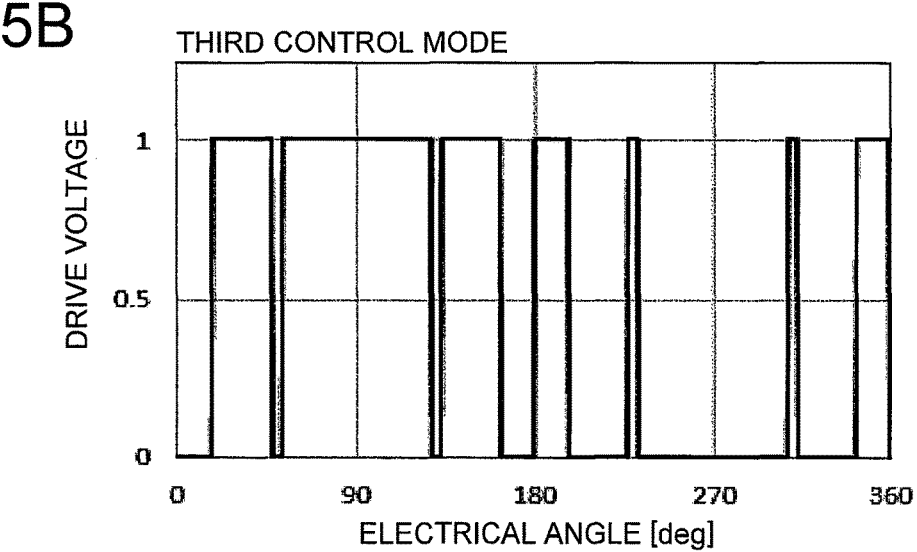
FIG. 5B is a graph for showing a pulse waveform in a third control mode in a case where the drive control device according to the modification example of the first embodiment of the present invention switches the control mode.
Figure 5C:
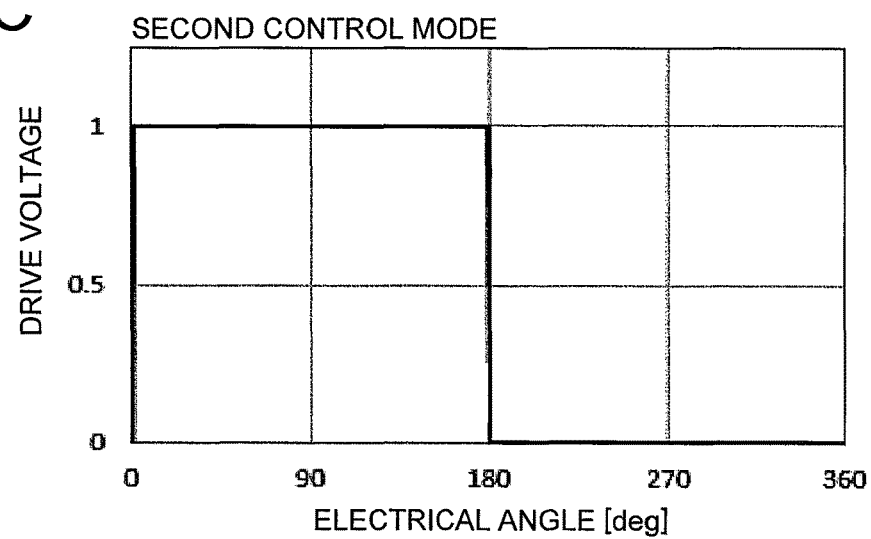
FIG. 5C is a graph for showing a pulse waveform in a second control mode in a case where the drive control device according to the modification example of the first embodiment of the present invention switches the control mode.

FIG. 5 are graphs for showing pulse waveforms in a case where a drive control device according to a modification example of the first embodiment switches the control mode. In FIG. 5A, FIG. 5B, and FIG. 5C, the horizontal axis represents an electrical angle (deg), which is a rotational angle of the rotator of the motor generator 4, and the vertical axis represents the drive voltage of the inverter 3 at the time when the maximum value of the drive voltage of the inverter 3 is set to 1. The range of the horizontal axis is equal to one period of the electrical angle of from 0 (deg) to 360 (deg). In the same control mode, the drive voltage of the inverter 3 has a waveform of repeating one period of the electrical angle. FIG. 5A and FIG. 5B represent waveforms of the drive voltage at the time when the control unit 5 performs PWM control, and FIG. 5C represents a waveform of the drive voltage at the time when the control unit 5 performs the rectangular wave control. For example, the first control mode may be switched to the second control mode via a third control mode shown in FIG. 5B, in which the number of times of switching the switching element 7 in one period of the electrical angle is smaller than that of the first control mode shown in FIG. 5A, and the number of times of switching the switching element 7 in one period of the electrical angle is larger than that of the second control mode shown in FIG. 5C. The one period of the electrical angle may be a period determined in advance. Now, a description is given of an operation of control in this modification example.

Figure 6:
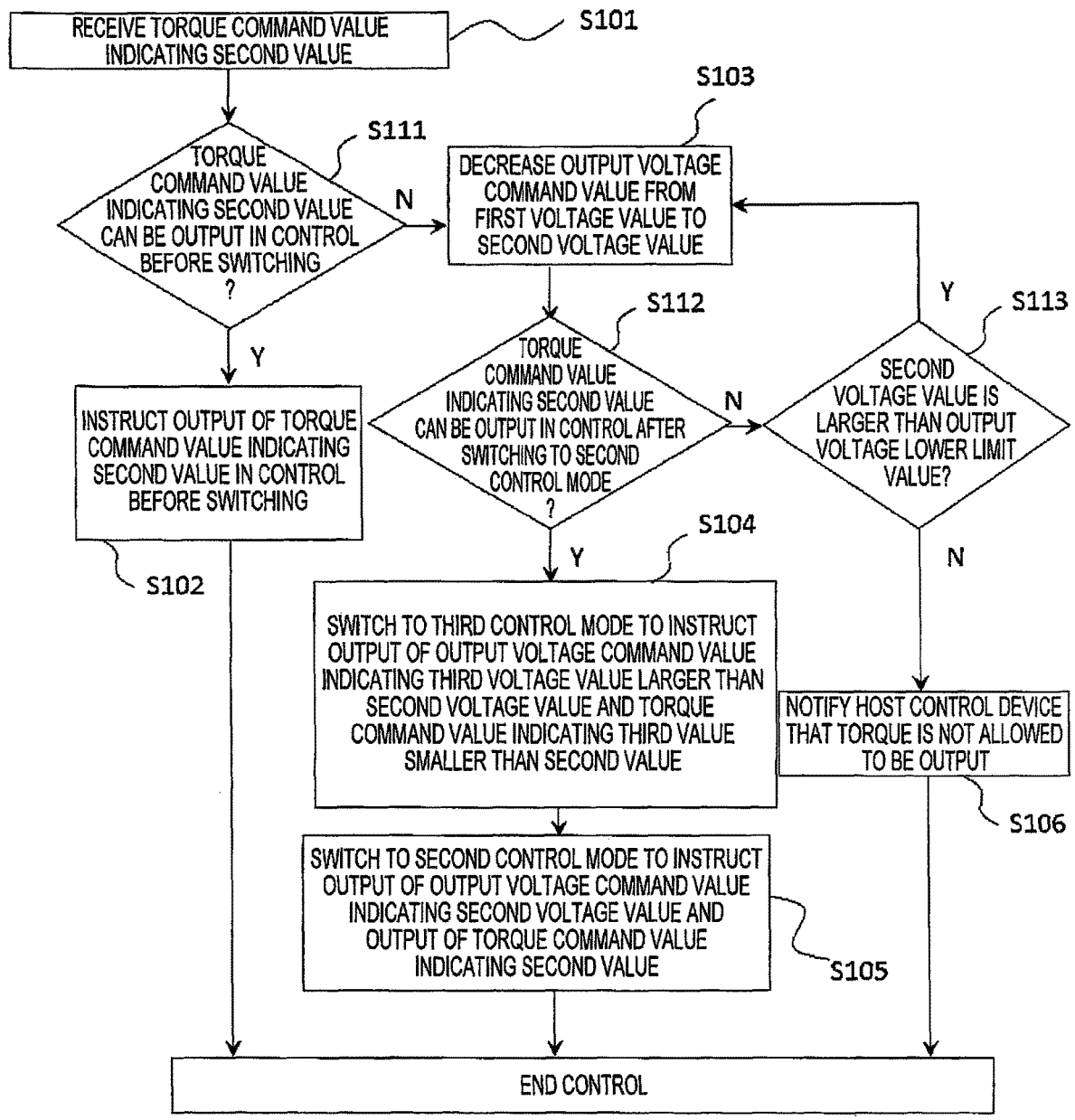
FIG. 6 is a flowchart in a case where the drive control device according to the modification example of the first embodiment of the present invention switches the control mode.

FIG. 6 is a flowchart in a case where the drive control device according to the modification example of the first embodiment switches the control mode. In FIG. 6, the control unit 5 of the drive control device 100 outputs the torque command value indicating a first value and an output voltage command value indicating a first voltage value under a state before switching, and performs control in the first control mode.

First, in Step S101, the drive control device 100 receives a torque command value for the motor generator 4 from the host control device 8. The value of the received torque command value is a second value.

Next, in a determination step S111, the control unit 5 determines whether the motor generator 4 can output a torque corresponding to the torque command value indicating the second value in the first control mode before switching.

Specifically, when the torque command value indicating the second value is equal to or smaller than the first short-time maximum torque, the control unit 5 determines that the motor generator 4 can output the torque corresponding to the torque command value indicating the second value, whereas when the torque command value indicating the second value is larger than the first short-time maximum torque, the control unit 5 determines that the motor generator 4 cannot output the torque corresponding to the torque command value indicating the second value.

When the determination result indicates that the motor generator 4 can output the torque corresponding to the torque command value indicating the second value in the first control mode, in Step S102, the control unit 5 outputs the torque corresponding to the torque command value indicating the second value without switching control from the first control mode.

When the determination result indicates that the motor generator 4 cannot output the torque corresponding to the torque command value indicating the second value in the first control mode, the processing advances to Step S103. In Step S103, the control unit 5 lowers the output voltage command value of the converter 2 from the first voltage value to the second voltage value to start determination.

That is, in the determination step S111, the control unit 5 determines whether the torque command value for the motor generator 4 exceeds the first short-time maximum torque, which is the first torque value determined in advance, in the first control mode, in which a drive current having a value equal to or smaller than the first current limit value is caused to flow through the motor generator 4 by the inverter 3 including the switching element 7 and being configured to input a DC output voltage output from the DC voltage source 10, switch the switching element 7 to apply the drive voltage to the motor generator 4, and cause a drive current to flow through the motor generator 4.

Next, in Step S112, referring to the second short-time maximum torque under control in the second control mode, in which the output voltage command value decreased to the second voltage value is applied, the control unit 5 determines whether the motor generator 4 can output the torque corresponding to the torque command value indicating the second value based on the magnitude relationship between the second short-time maximum torque and the torque command value indicating the second value. When the control unit 5 determines in Step S112 that the torque command value indicating the second value is equal to or smaller than the second short-time maximum torque and the motor generator 4 can output the torque corresponding to the torque command value indicating the second value, in a first switching step S104, the control unit 5 switches the control mode from the first control mode to the third control mode.

That is, when the control unit 5 determines in the determination step S111 that the torque command value for the motor generator 4 in the first control mode exceeds the first short-time maximum torque, which is the first torque value determined in advance, in the first switching step S104, the control unit 5 switches from the first control mode to the third control mode, in which a drive current having a third current value larger than the first current limit value and equal to or smaller than the second current limit value, which is larger than the first current limit value, is caused to flow. Further, the third current value is larger than the first current value in the first control mode.

Next, in the first switching step S104, under control in the third control mode, the control unit 5 outputs an output voltage command value for lowering the output voltage to a third voltage value larger than the second voltage value and smaller than the first voltage value, and outputs, to the inverter 3, a switching command for outputting the torque corresponding to the torque command value indicating a third value larger than the first value and smaller than the second value.

Next, in a second switching step S105, the control unit 5 switches the control mode from the third control mode to the second control mode.

That is, in the second switching step S105, the control unit 5 switches from the third control mode to the second control mode, in which a drive current having a second current value larger than the first current limit value and equal to or smaller than the second current limit value, which is larger than the first current limit value, is caused to flow. Further, the second current value is larger than the third current value.

Next, in the second switching step S105, under control in the second control mode, the control unit 5 outputs to the converter 2 an output voltage command value for lowering the output voltage to the second voltage value, outputs to the inverter 3 a switching command for outputting the torque corresponding to the torque command value indicating the second value, and ends the control.

That is, in the second switching step S105, the control unit 5 performs control of causing the output torque of the motor generator 4 to exceed the first short-time maximum torque of the first torque value determined in advance in the second control mode, to thereby cause a drive current to flow through the switching element 7.

When the control unit 5 determines in Step S112 that the motor generator 4 cannot output the torque command value indicating the second value, in Step S113, the control unit 5 determines whether the output voltage command value indicating the second voltage value is larger than the output voltage lower limit value of the output voltage that can be output from the converter 2. When the output voltage command value indicating the second voltage value is larger than the output voltage lower limit value in Step S113, the processing returns to Step S103, and determination is made under a condition of the second voltage value in which the output voltage command value is further decreased. When the output voltage command value indicating the second voltage value is equal to or smaller than the output voltage lower limit value in Step S113, the output voltage command value cannot be further decreased from the second voltage value, and thus a torque corresponding to the torque command value indicating the second value cannot be output. Thus, in that case, in Step S106, the control unit 5 notifies the host control device 8 that a torque cannot be output, and ends the control.

Figure 7:
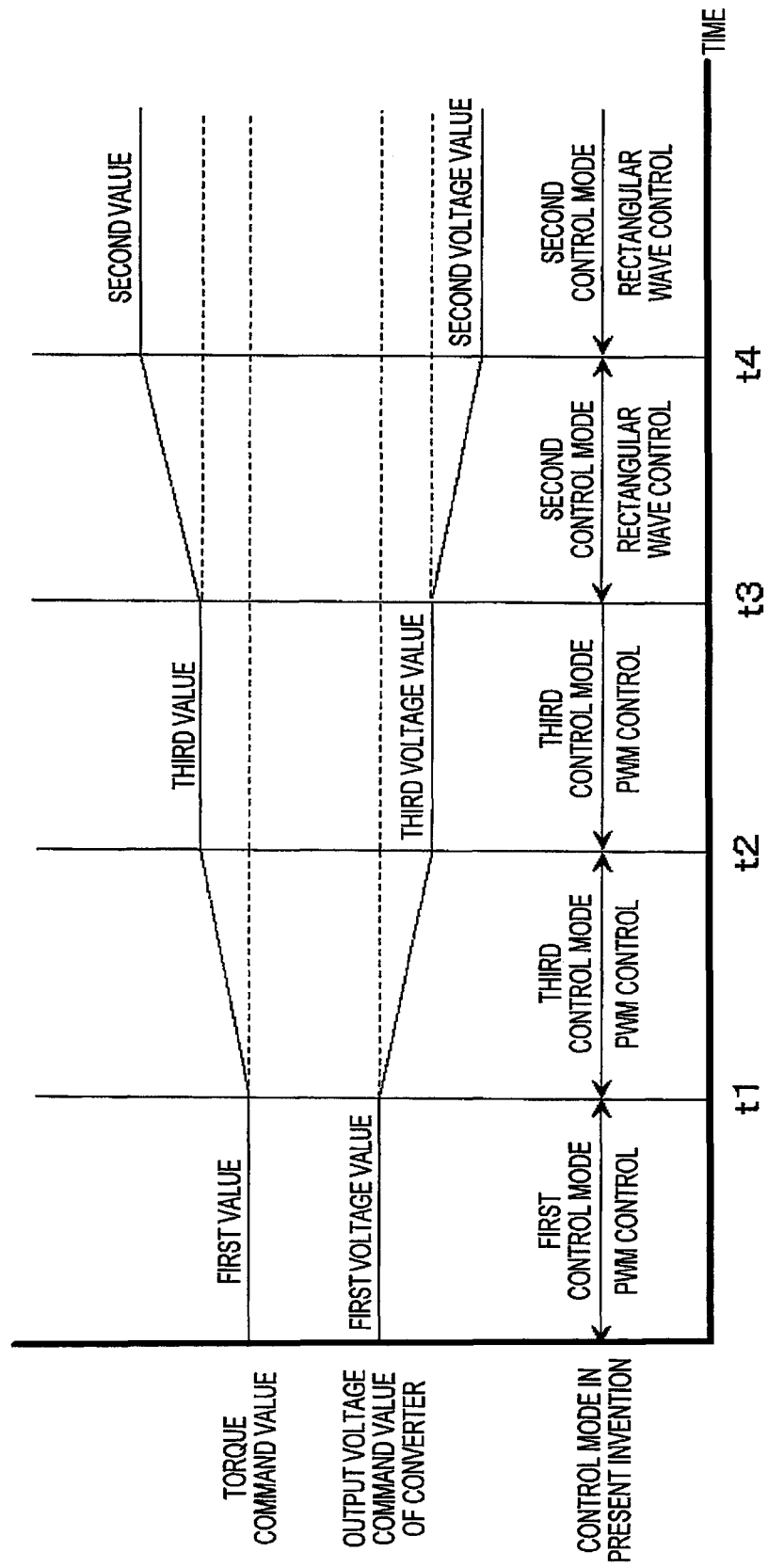
FIG. 7 is a graph for showing a timing in a case where the drive control device according to the modification example of the first embodiment of the present invention switches the control mode.

FIG. 7 is a graph for showing a timing in a case where the drive control device according to the modification example of the first embodiment switches the control mode. In FIG. 7, the horizontal axis represents time, and the vertical axis represents the torque command value and the output voltage command value of the converter. In FIG. 7, at the time t1, at which the inverter 3 is driven under the PWM control in the first control mode, which is a control mode of control before switching, the control unit 5 receives from the host control device 8 a torque command value for increasing the torque from the first value to the second value. At the time t1, the control unit 5 decreases the output voltage command value, which is output from the converter 2, from the first voltage value to the third voltage value, and at the same time, switches control to the PWM control in the third control mode.

From the time t1 to the time t2, the torque command value is controlled to be monotonically increased from the first value to the third value. Further, the output voltage command value is controlled to be decreased from the first voltage value to the third voltage value along with increase in torque command value.

At the time t2, the output voltage of the converter 2 reaches an output voltage command value indicating the third voltage value specified by the control unit 5. Further, the torque of the motor generator 4 reaches a torque command value indicating the third value.

From the time t2 to a time t3, the control unit 5 performs control of keeping the output voltage command value indicating the third voltage value at a fixed value.

From the time t3 to a time t4, the torque command value is controlled to be monotonically increased from the third value to the second value. Further, the output voltage command value is controlled to be decreased from the third voltage value to the second voltage value along with increase in torque command value. Further, when the inverter 3 is driven under the rectangular wave control in the second control mode, the control unit 5 drives the inverter 3 within a torque range in which the second short-time maximum torque being a torque that can be output from the motor generator 4 is set to be the upper limit.

At the time t4, the output voltage of the converter 2 reaches the output voltage command value indicating the second voltage value specified by the control unit 5. Further, the torque of the motor generator 4 reaches the torque command value indicating the second value received from the host control device 8, and switching of control is ended.

After the time t4, the control unit 5 performs control of keeping the output voltage command value indicating the second voltage value at a fixed value until the torque command value indicating the second value received from the host control device 8 changes.

In the first embodiment, the description has been given of an example of performing driving under the PWM control from the time t1 to the time t2 of FIG. 7. However, control from the time t1 to the time t2 is not required to be set to the PWM control.

For example, control in the third control mode may be over-modulation PWM control, synchronized-nine pulse control, or control of decreasing the carrier frequency for the first control mode, which is a mode of control before switching. The number of times of switching the switching element 7 in one period of the electrical angle under control in the second control mode is only required to be smaller than the number of times of switching the switching element 7 in one period of the electrical angle under control in the third control mode.

Further, when switching from the first control mode to the second control mode, the control unit 5 may perform control of switching the control mode in order of the third control mode, • • •, and an n-th control mode (n is a natural number of 4 or more).

In this case, the number of times of switching the switching element 7 in one period of the electrical angle under control in the n-th control mode is larger than the number of times of switching the switching element 7 in one period of the electrical angle under control in the second control mode, and is smaller than the number of times of switching the switching element 7 in one period of the electrical angle under control in the (n−1)th control mode. Further, the torque command value indicating the n-th value in the n-th control mode is larger than the torque command value indicating the (n−1)th value in the (n−1)th control mode, and is smaller than the torque command value indicating the second value in the second control mode. Further, the output voltage command value in the n-th control mode is larger than the output voltage command value indicating the second voltage value in the second control mode, and is smaller than the output voltage command value indicating the (n−1) th voltage value in the (n−1)th control mode.

Second Embodiment

In a second embodiment of the present invention, a description is given of a case in which the motor generator 4 includes a claw-pole rotary electric machine including a field winding.

Figure 8:
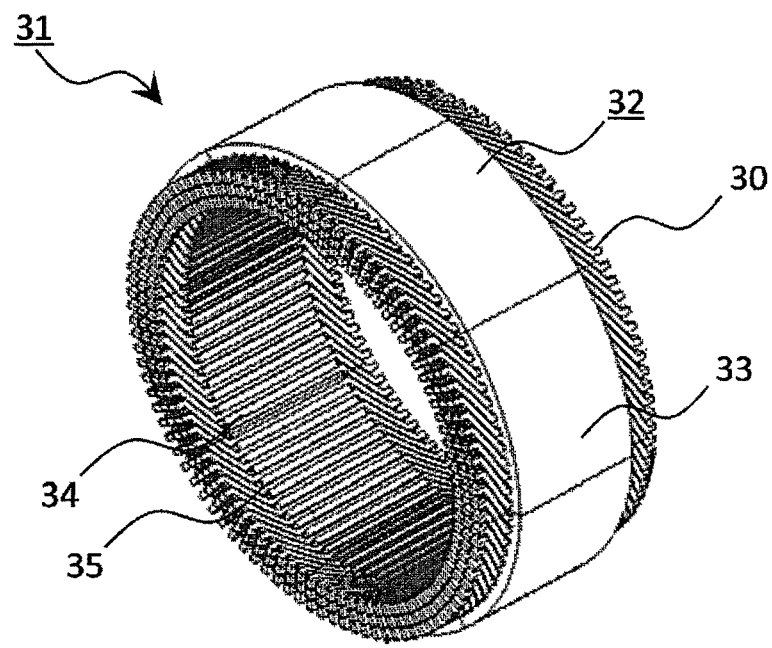
FIG. 8 is a perspective view for illustrating an appearance of a stator of a motor generator in a drive control device according to a second embodiment of the present invention.
Figure 9:
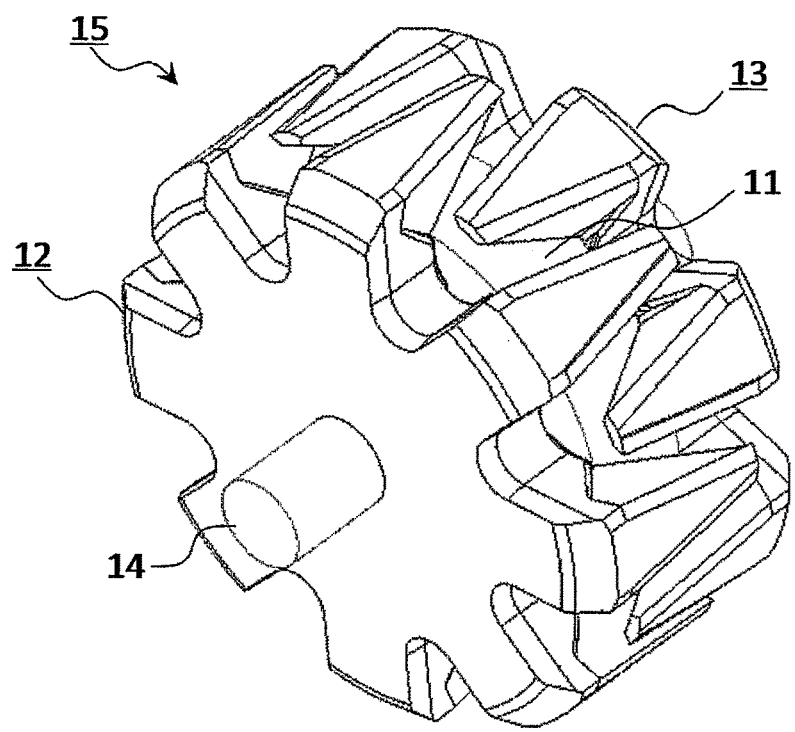
FIG. 9 is a perspective view for illustrating an appearance of a rotator of the motor generator in the drive control device according to the second embodiment of the present invention.
Figure 10:
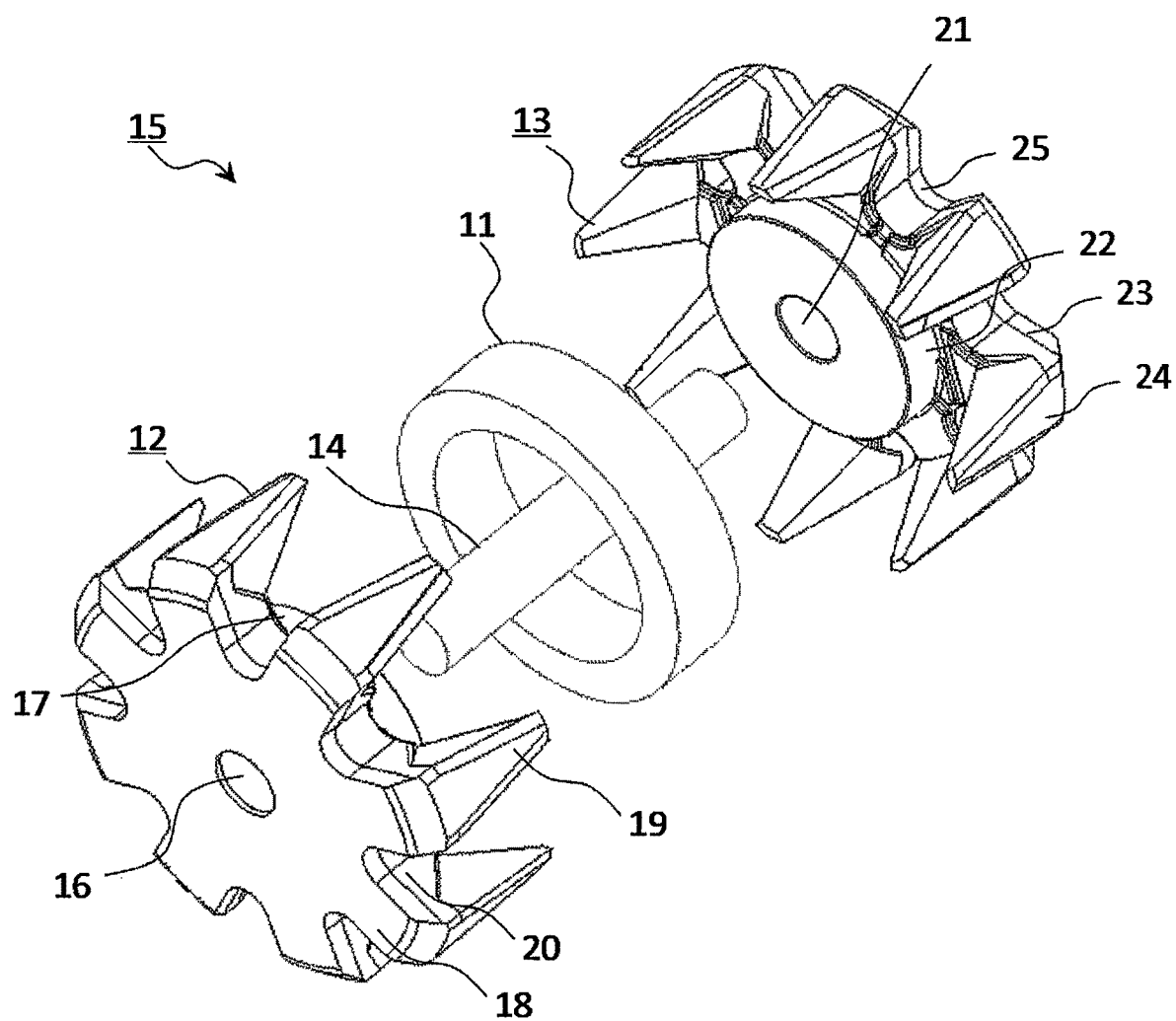
FIG. 10 is an exploded perspective view for illustrating the rotator of the motor generator in the drive control device according to the second embodiment of the present invention.

FIG. 8 is a perspective view for illustrating an appearance of a stator of a motor generator in a drive control device according to the second embodiment. FIG. 9 is a perspective view for illustrating an appearance of a rotator of the motor generator in the drive control device according to the second embodiment. FIG. 10 is an exploded perspective view for illustrating the rotator of the motor generator in the drive control device according to the second embodiment.

In FIG. 8, a stator 31 of the claw-pole rotary electric machine includes the armature coil 30, to which a drive voltage is to be applied by the inverter 3, a circular core back 33, a stator core 32 equipped with teeth 34 protruding from the inner periphery of the core back 33 and arranged at equal intervals in a circumferential direction of the stator core 32.

The armature coil 30 is mounted on a slot 35 formed between the teeth 34 adjacent to one another in the circumferential direction.

In FIG. 9 and FIG. 10, the rotator 15 of the claw-pole rotary electric machine includes a field coil 11 for causing a field current to flow to cause a magnetic flux, a first claw-shaped field core 12 and a second claw-shaped field core 13 made of magnetic materials, which are provided to cover the field coil 11 and form a magnetic pole by a magnetic flux, and a shaft 14. The first and second claw-shaped field cores 12 and 13 are supported on the outer periphery of the shaft 14. That is, the rotary electric machine includes the first and second claw-shaped field cores 12 and 13, and a field winding being the field coil 11 mounted to the first and second claw-shaped field cores 12 and 13.

The first claw-shaped field core 12 includes a first boss portion 17 having an outer periphery surface with a cylindrical shape and being formed by a shaft insertion hole 16 passing through its shaft center position, a first yoke portion 18 having a thick ring shape and protruding from an edge at one end in the axial direction of the first boss portion 17 toward the outer side of the circumferential direction, and eight first claw portions 19 extending from an outer periphery portion of the first yoke portion 18 toward the other end of the axial direction and being arranged at equal angle pitches in the circumferential direction. The first claw portion 19 has a substantially trapezoidal shape as its outermost surface shape, and is formed to have such a tapered shape that its width in the circumferential direction gradually becomes smaller and its thickness in the radial direction gradually becomes smaller toward its tip. Further, a first recess portion 20 is formed at each part positioned between the adjacent first claw portions 19 of the first yoke portion 18 so that the first recess portion 20 is recessed toward the inner side of the radial direction and passes in the axial direction.

The second claw-shaped field core 13 includes a second boss portion 22 having an outer periphery surface with a cylindrical shape and being formed by a shaft insertion hole 21 passing through its shaft center position, a second yoke portion 23 having a thick ring shape and protruding from an edge at the other end in the axial direction of the second boss portion 22 toward the outer side of the circumferential direction, and eight second claw portions 24 extending from an outer periphery portion of the second yoke portion 23 toward one end of the axial direction and being arranged at equal angle pitches in the circumferential direction. The second claw portion 24 has a substantially trapezoidal shape as its outermost surface shape, and is formed to have such a tapered shape that its width in the circumferential direction gradually becomes smaller and its thickness in the radial direction gradually becomes smaller toward its tip. Further, a second recess portion 25 is formed at each part positioned between the adjacent second claw portions 24 of the second yoke portion 23 so that the second recess portion 25 is recessed toward the inner side of the radial direction and passes in the axial direction.

As illustrated in FIG. 9, the first and second claw-shaped field cores 12 and 13 constructed as described above form a rotator core by causing the first and second claw portions 19 and 24 to engage with one another alternatively, causing the other end surface of the first boss portion 17 and one end surface of the second boss portion 22 to be in abutment with one another, and fixing the other end surface of the first boss portion 17 and the one end surface of the second boss portion 22 to the shaft 14 inserted into the shaft insertion holes 16 and 21, to thereby construct the rotator core. The rotator core constructed in this manner has a substantially cylindrical surface as its outer peripheral surface, and has positions of the first and second claw-shaped field cores 12 and 13 in the circumferential direction adjusted so that intervals between the first and second claw-shaped portions 19 and 24 in the circumferential direction are equal to each other. Further, the field coil 11 is arranged in a space surrounded by the first and second boss portions 17 and 22, the first and second yoke portions 18 and 23, and the first and second claw-shaped portions 19 and 24.

The rotators 15 are arranged opposite to each other with a space in the inner periphery of the teeth 34 of the stator 31, and the shaft 14 is supported by a bearing (not shown) so as to be freely rotatable.

Further, a field current can be supplied to the field coil 11 from a field module (not shown) in the inverter 3 via a brush (not shown). That is, the inverter 3 further includes the field module configured to supply a field current to a field winding being the field coil 11. The field current that can flow through the field module has an upper limit defined depending on a third current limit value (corresponding to the second current limit value of the drive current in the second control mode) being the current limit value of the field module. When a current is constantly caused to flow through the field module and exceeds the third current limit value, the control unit 5 switches the field module or limits the field current caused to flow by a regulator in the field module, to thereby enable the field current to be equal to or smaller than the third current limit value when the current flows.

Next, an operation of the second embodiment is described. The output voltage of the converter 2 is operated to be lowered and a current is caused to flow through the armature coil 30 of the motor generator 4 as described in the first embodiment. A current is caused to flow through the field coil 11 of the motor generator 4 by operating the field module in the inverter 3. At this time, when the torque command value for the motor is given to instruct the field module to cause the field current corresponding to the third current limit value to flow through the field coil 11, the control unit 5 determines whether the field current at a time when the field module constantly causes a current is equal to or smaller than the third current limit value based on the output voltage detection value, drop in voltage of a brush portion, and the resistance value of the field coil 11. When it is determined that the field current at the time when the field module constantly causes a current is equal to or smaller than the third current limit value, the control unit 5 corrects the maximum torque in the current value at the time when the field current is constantly caused to flow as the torque command value, and transmits a control command to the inverter 3 so that the field module constantly causes the field current. The field module in the inverter 3 receives the command from the control unit 5, and constantly causes the field current to flow through the field coil 11. That is, in the second control mode, the field module supplies the field current that depends on the second current limit value to the field winding being the field coil 11.

With those configurations, the field current is caused to flow through the field coil 11 in the motor generator 4, and the field current caused to flow through the field coil 11 generates magnetic poles in the first and second claw-shaped field cores 12 and 13. The magnetic poles are generated and a current is caused to flow through the armature coil 30, to thereby cause a torque in the motor generator 4.

Now, a description is given of an effect of the second embodiment. When the control unit 5 outputs a command to the field module so that the field module constantly causes a current, the rotator 15 of the claw-pole rotary electric machine is magnetized by the field current output from the field module to form a magnetic pole. In general, as the field current becomes larger, the magnetic flux of the rotator 15 of the claw-pole rotary electric machine increases. Thus, the magnetic flux that occurs in the rotator 15 of the claw-pole rotary electric machine takes the maximum value under a condition of the output voltage. Then, as described above in the first embodiment, a current of the second current limit value that is caused to flow when the number of times of switching the switching element is decreased can be caused to flow through the armature coil 30. Thus, the value of the field current caused to flow by the field module takes the maximum value of the field current that can be caused to flow when a claw-pole rotary electric machine is used under the condition of the output voltage. Therefore, when the motor generator 4 is a claw-pole rotary electric machine, the maximum torque can be increased, and as described in the first embodiment, it is possible to handle restarting of a larger-sized engine or downsize the motor generator 4.

Third Embodiment

In a third embodiment of the present invention, a description is given of a case of switching from the second control mode to the first control mode. The configuration is as described in the first embodiment.

Now, a description is given of an operation in the third embodiment.

Figure 11:
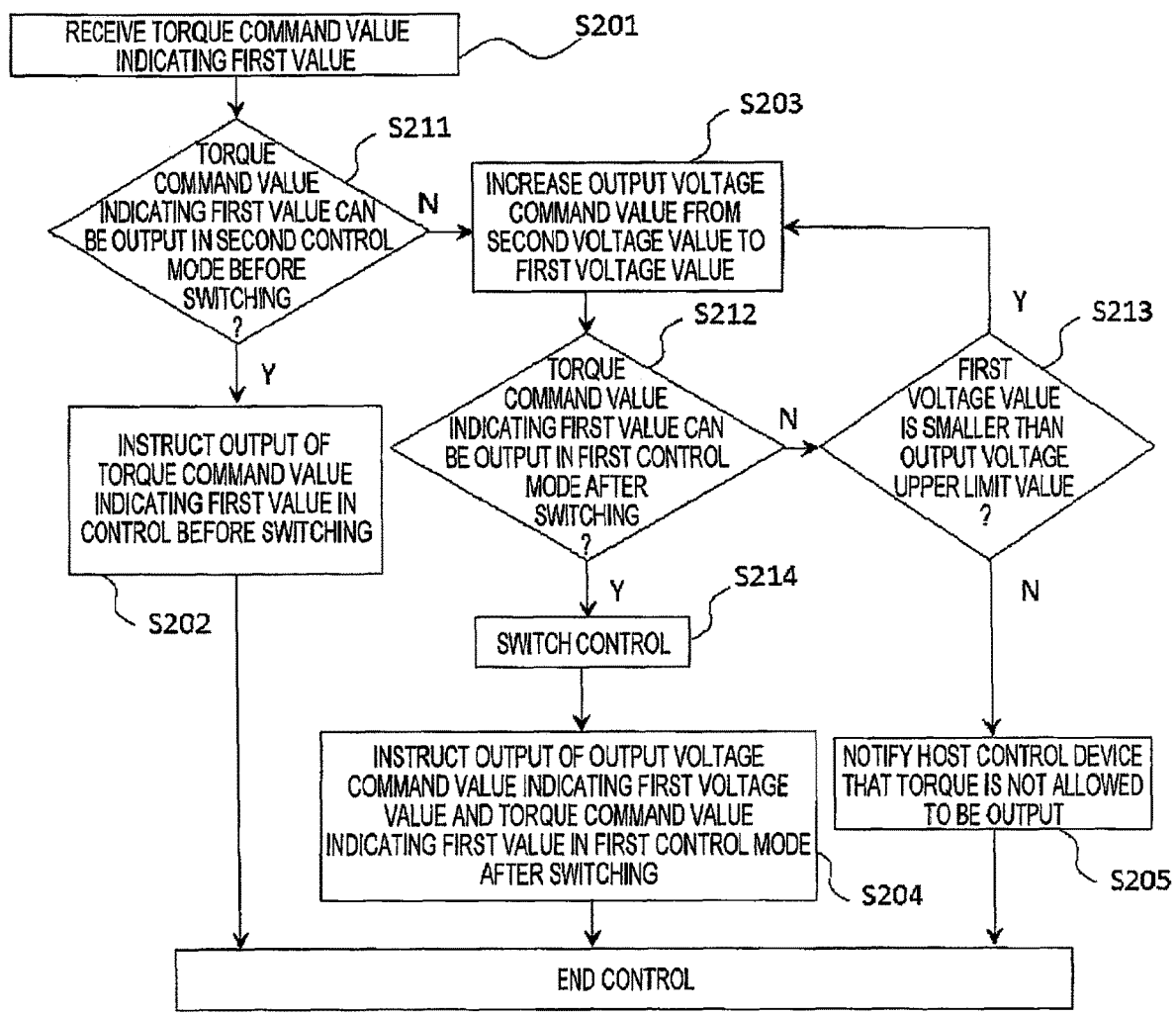
FIG. 11 is a flowchart in a case where a drive control device according to a third embodiment of the present invention switches a control mode.

FIG. 11 is a flowchart in a case where the drive control device according to the third embodiment switches the control mode. In FIG. 11, the control unit 5 outputs the torque command value indicating the second value and the output voltage command value indicating the second voltage value before switching of control, and performs control in the second control mode.

First, in Step S201, the drive control device 100 receives the torque command value for the motor generator 4 from the host control device 8. The value of the received torque command value is the first value. The first value is smaller than the second value.

Next, in a determination step S211, the control unit 5 determines whether the motor generator 4 can output a torque corresponding to the torque command value indicating the first value in the second control mode before switching.

Specifically, when the torque command value indicating the first value is equal to or larger than the first short-time maximum torque, the control unit 5 determines that the motor generator 4 can output the torque corresponding to the torque command value indicating the first value in the second mode, whereas when the torque command value indicating the first value is smaller than the first short-time maximum torque, the control unit 5 determines that the motor generator 4 cannot output the torque corresponding to the torque command value indicating the first value in the second mode.

When the determination result indicates that the motor generator 4 can output the torque corresponding to the torque command value indicating the first value in the second control mode, in Step S202, the control unit 5 outputs the torque corresponding to the torque command value indicating the first value without switching control from the second control mode.

When the determination result indicates that the motor generator 4 cannot output the torque corresponding to the torque command value indicating the first value in the second control mode, the processing advances to Step S203. In Step S203, the control unit 5 increases the output voltage command value of the converter 2 from the second voltage value to the first voltage value to start determination.

That is, in the determination step S211, the control unit 5 determines whether the torque command value for the motor generator 4 falls below the first short-time maximum torque, which is the first torque value determined in advance, in the second control mode, in which a drive current having a value equal to or smaller than the second current limit value is caused to flow through the motor generator 4 by the inverter 3 including the switching element 7 and being configured to input a DC output voltage output from the DC voltage source 10, switch the switching element 7 to apply the drive voltage to the motor generator 4, and cause a drive current to flow through the motor generator 4.

Next, in Step S212, referring to the first short-time maximum torque under control in the first control mode, in which the output voltage command value increased to the first voltage value is applied, the control unit 5 determines whether the motor generator 4 can output the torque corresponding to the torque command value indicating the first value based on the magnitude relationship between the first short-time maximum torque and the torque command value indicating the first value. When the control unit 5 determines in Step S212 that the torque command value indicating the first value is equal to or smaller than the first short-time maximum torque and the motor generator 4 can output the torque corresponding to the torque command value indicating the first value, in a switching step S214, the control unit 5 switches the control mode from the second control mode to the first control mode.

That is, when the control unit 5 determines in the determination step S211 that the torque command value for the motor generator 4 in the second control mode falls below the first short-time maximum torque, which is the first torque value determined in advance, in the switching step S214, the control unit 5 switches from the second control mode to the first control mode, in which a drive current smaller than the first current limit value is caused to flow.

Then, in Step S204, under control in the first control mode, the control unit 5 outputs, to the converter 2, the output voltage command value for increasing the output voltage to the first voltage value larger than the second voltage value, outputs, to the inverter 3, a switching command for outputting the torque corresponding to the torque command value indicating the first value smaller than the second value, and ends the control.

When the control unit 5 determines in Step S212 that the motor generator 4 cannot output the torque command value indicating the first value, in Step S213, the control unit 5 determines whether the output voltage command value indicating the first voltage value is larger than the output voltage upper limit value of the output voltage that can be output from the converter 2. When the output voltage command value indicating the first voltage value is smaller than the output voltage upper limit value in Step S213, the processing returns to Step S203, and determination is made under a condition of the first voltage value in which the output voltage command value is further increased. When the output voltage command value indicating the first voltage value is equal to or larger than the output voltage upper limit value in Step S213, the output voltage command value cannot be further increased from the first voltage value, and thus a torque corresponding to the torque command value indicating the first value cannot be output. Thus, in that case, in Step S205, the control unit 5 notifies the host control device 8 that a torque cannot be output, and ends the control.

Figure 12:
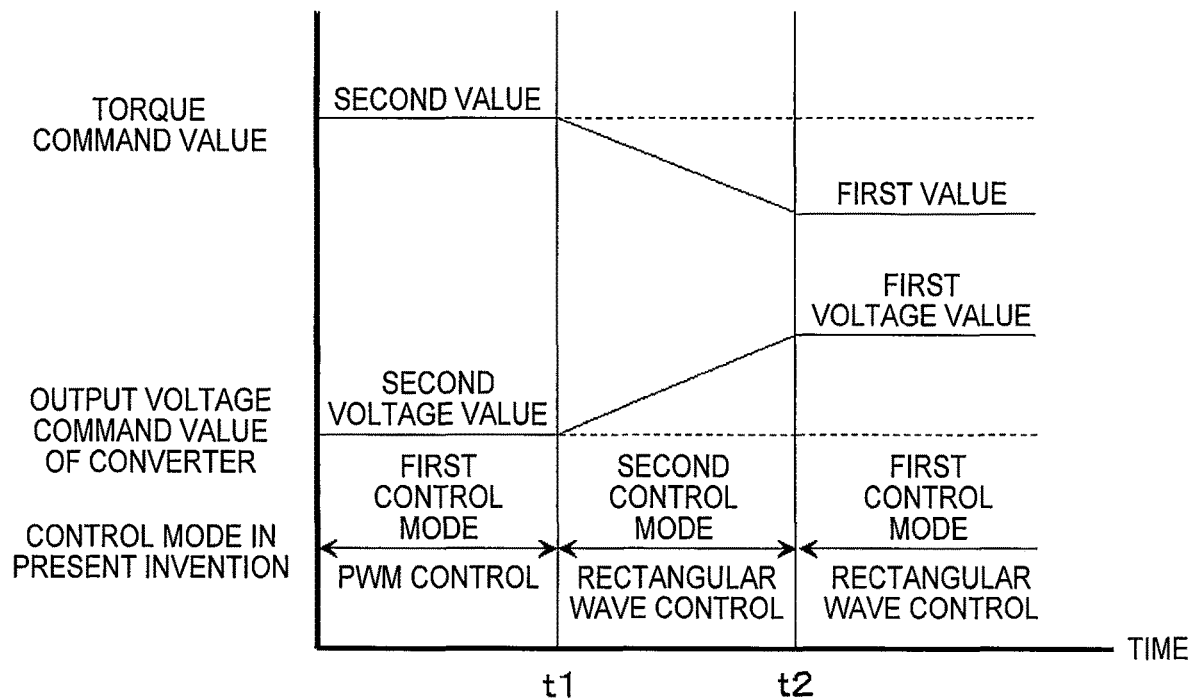
FIG. 12 is a graph for showing a timing in a case where the drive control device according to the third embodiment of the present invention switches the control mode.

FIG. 12 is a graph for showing a timing in a case where the drive control device according to the third embodiment switches the control mode. In FIG. 12, the horizontal axis represents time, and the vertical axis represents the torque command value and the output voltage command value of the converter. In FIG. 12, at the time t1, at which the inverter 3 is driven under the rectangular wave control in the second control mode, which is a control mode of control before switching, the control unit 5 receives from the host control device 8 a torque command value for decreasing the torque from the second value to the first value. At the time t1, the control unit 5 increases the output voltage command value, which is output from the converter 2, from the second voltage value to the first voltage value, and at the same time, switches control to the PWM control in the first control mode.

From the time t1 to the time t2, the torque command value is controlled to be monotonically decreased from the second value to the first value. Further, the output voltage command value is controlled to be increased from the second voltage value to the first voltage value along with decrease in torque command value.

At the time t2, the output voltage of the converter 2 reaches an output voltage command value indicating the first voltage value specified by the control unit 5. Further, the torque of the motor generator 4 reaches a torque command value indicating the first value.

After the time t2, the control unit 5 performs control of keeping the output voltage command value indicating the first voltage value at a fixed value.

The PWM control is given as an example of the first control mode as described in the first embodiment. A conduction angle can be freely changed in, for example, the PWM control, and thus, for example, the motor generator 4 can be driven with high efficiency or driven with a small electromagnetic excitation force by causing a current to flow at an appropriate conduction angle. Thus, when the motor generator 4 is driven in the first control mode, the second control mode can be switched in advance to drive the motor generator 4 with high efficiency and with small noise.

The description has been given of a case of switching from the second control mode to the first control mode in the third embodiment. However, the second control mode is not required to be directly switched to the first control mode, and for example, as shown in FIG. 5B, the second control mode may be switched to the first control mode via the third control mode, in which the number of times of switching the switching element 7 is smaller than that of the first control mode and the number of times of switching the switching element 7 is larger than that of the second control mode.

Further, when switching from the second control mode to the first control mode, the control unit 5 may perform control of switching the control mode in order of an n-th control mode • • •, and the third control mode (n is a natural number of 4 or more).

In the first to third embodiments, the converter 2 lowers the DC voltage output from the DC power supply 1 when switching from the first control mode to the second control mode, and increases the DC voltage output from the DC power supply 1 when switching from the second control mode to the first control mode. However, the manner of increasing/decreasing the DC voltage (output voltage) is not limited thereto as long as the torque command value can be output in the control mode after switching of control.

REFERENCE SIGNS LIST

1 DC power supply, 2 converter, 3 inverter, 4 motor generator, 5 control unit, 6 voltage measurement unit, 7 switching element, 8 host control device, 9 current detector, 10 DC voltage source, 11 field coil, 12 first claw-shaped field core, 13 second claw-shaped field core, 14 shaft, 15 rotator of claw-pole rotary electric machine, 16, 21 shaft insertion hole, 17 first boss portion, 18 first yoke portion, 19 first claw portion, 20 first recess portion, 22 second boss portion, 23 second yoke portion, 24 second claw portion, 25 second recess portion, 30 armature coil, 31 stator, 32 stator core, 33 core back, 34 tooth, 35 slot, 90 processor, 91 storage unit, 100 drive control device

The invention claimed is:

1. A drive control device, comprising:
    a DC voltage source configured to output a DC output voltage;
    an inverter, which includes a switching element, and is configured to receive input of the DC output voltage from the DC voltage source and switch the switching element, to thereby apply a drive voltage to a rotary electric machine to cause a drive current to flow through the rotary electric machine; and
    a control unit configured to:
        control the DC output voltage of the DC voltage source; and
        perform control of causing, based on a torque command value for the rotary electric machine, a drive current to flow through the switching element in a first control mode, in which a drive current having a value equal to or smaller than a first current limit value is caused to flow, and a second control mode, in which a drive current having a value larger than the first current limit value and equal to or smaller than a second current limit value, which is larger than the first current limit value, is caused to flow,
    wherein the control unit is configured to switch, when the torque command value for the rotary electric machine in the first control mode exceeds a predetermined torque value, from the first control mode to the second control mode to perform control of causing an output torque of the rotary electric machine to exceed the predetermined torque value,
    wherein a period in which the switching element is turned on within a predetermined period in the second control mode is longer than a period in which the switching element is turned on within the predetermined period in the first control mode, and
    wherein a number of times of switching the switching element in the second control mode is smaller than a number of times of switching the switching element in the first control mode,
    wherein the first current limit value and the second current limit value are values that are determined depending on a switching loss being a loss caused by switching the switching element,
    wherein the switching loss at the second current limit value is smaller than the switching loss at the first current limit value, and
    wherein the control unit is configured to perform control of causing, when an amount of heat generated in the switching element due to a drive current after switching to the second control mode with the DC output voltage of the DC voltage source in the first control mode exceeds a limit value for an amount of heat generated in the switching element and the torque command value after switching to the second control mode is larger than a first torque value being the predetermined torque value and smaller than a second torque value corresponding to the second current limit value, the DC output voltage of the DC voltage source in the second control mode to be smaller than the DC output voltage of the DC voltage source in the first control mode and suppressing the drive current in the second control mode to be equal to or smaller than the second current limit value.

2. The drive control device according to claim 1, wherein the control unit is configured to switch, when the torque command value for the rotary electric machine in the second control mode falls below a predetermined torque value, from the second control mode to the first control mode to perform control of causing the output torque of the rotary electric machine to fall below the predetermined torque value.

3. The drive control device according to claim 1, wherein the DC voltage source includes a converter configured to input a DC voltage and output the DC output voltage.

4. The drive control device according to claim 2, wherein the DC voltage source includes a converter configured to input a DC voltage and output the DC output voltage.

5. The drive control device according to claim 3, wherein the DC voltage source is configured to output the DC output voltage lower than the DC voltage.

6. The drive control device according to claim 4, wherein the DC voltage source is configured to output the DC output voltage lower than the DC voltage.

7. The drive control device according to claim 1, wherein the control unit is configured to perform, in the second control mode, synchronized pulse control of switching the switching element by a predetermined number of times within half a period of an electrical angle of the drive voltage in synchronization with half the period of the electrical angle of the drive voltage.

8. The drive control device according to claim 7, wherein the control unit is configured to perform, in the second control mode, rectangular wave control of controlling the drive voltage in a rectangular wave form.

9. The drive control device according to claim 1, wherein the predetermined torque value is a maximum value of the output torque of the rotary electric machine in the first control mode.

10. The drive control device according to claim 1,
    wherein the rotary electric machine includes:
        a stator including an armature coil, to which the drive voltage is to be applied; and
        a rotator, which includes a claw-shaped field core and a field winding mounted to the claw-shaped field core, and is arranged facing an inner circumferential side of the stator in a freely rotatable manner,
    wherein the inverter further includes a field module configured to supply a field current to the field winding, and
    wherein the field module is configured to supply the field current to the field winding depending on the second current limit value in the second control mode.

11. The drive control device according to claim 1, wherein the control unit is configured to drive, when switching to the second control mode, the rotary electric machine in a third control mode, in which the number of times of switching the switching element is smaller than the number of times of switching the switching element within a predetermined period in the first control mode and is larger than the number of times of switching the switching element within the predetermined period in the second control mode.

12. A drive control method to be executed by a processor, the drive control method comprising:
    a determining step of determining whether a torque command value for a rotary electric machine in a first control mode exceeds a predetermined torque value, the first control mode being configured such that a drive current having a value equal to or smaller than a first current limit value is caused to flow through the rotary electric machine by an inverter, the inverter including a switching element and being configured to receive input of a DC output voltage output from a DC voltage source and switch the switching element, to thereby apply a drive voltage to the rotary electric machine to cause the drive current to flow through the rotary electric machine;

a switching step of switching, when it is determined in the determining step that the torque command value for the rotary electric machine in the first control mode exceeds the predetermined torque value, from the first control mode to a second control mode, in which a drive current having a value larger than the first current limit value and equal to or smaller than a second current limit value, which is larger than the first current limit value, is caused to flow; and a torque control step of performing control of causing an output torque of the rotary electric machine to exceed the predetermined torque value in the second control mode, to thereby cause a drive current to flow through the switching element, wherein a period in which the switching element is turned on within a predetermined period in the second control mode is longer than a period in which the switching element is turned on within the predetermined period in the first control mode, wherein a number of times of switching the switching element in the second control mode is smaller than a number of times of switching the switching element in the first control mode, wherein the first current limit value and the second current limit value are values that are determined depending on a switching loss being a loss caused by switching the switching element, wherein the switching loss at the second current limit value is smaller than the switching loss at the first current limit value, and wherein the drive control method further comprises causing, when an amount of heat generated in the switching element due to a drive current after switching to the second control mode with the DC output voltage of the DC voltage source in the first control mode exceeds a limit value for an amount of heat generated in the switching element and the torque command value after switching to the second control mode is larger than a first torque value being the predetermined torque value and smaller than a second torque value corresponding to the second current limit value, the DC output voltage of the DC voltage source in the second control mode to be lower than the DC output voltage of the DC voltage source in the first control mode and suppressing the drive current in the second control mode to be equal to or smaller than the second current limit value.

* * * * *